(12) United States Patent
Cheng (10) Patent No.: US 6,830,255 B2
(45) Date of Patent: Dec. 14, 2004

(54) SCOOTER WITH A SHOCK-ABSORBING UNIT

(76) Inventor: Kun-Wei Cheng, No. 7, Alley 6, Lane 452, Shui-Yuan Rd., Ta-Chia Chen, Taichung Hsien (TW)

( * ) Notice: Subject to any disclaimer, the term of this patent is extended or adjusted under 35 U.S.C. 154(b) by 39 days.

(21) Appl. No.: 10/342,214

(22) Filed: Jan. 15, 2003

(65) Prior Publication Data

US 2004/0135334 A1 Jul. 15, 2004

(51) Int. Cl.[7] .............................................. B62M 1/00
(52) U.S. Cl. .................... 280/87.041; 180/227
(58) Field of Search ............................... 180/227, 228, 180/219, 205, 206, 180, 181; 280/87.041, 87.043, 87.03, 87.021, 87.042

(56) References Cited

U.S. PATENT DOCUMENTS

| | | | | | |
|---|---|---|---|---|---|
| 4,799,702 A | * | 1/1989 | Wang | .................... | 280/87.041 |
| 5,069,303 A | * | 12/1991 | Fuller | .......................... | 180/219 |
| 5,469,930 A | * | 11/1995 | Wiers | ......................... | 180/227 |
| 5,816,356 A | * | 10/1998 | Jansson et al. | ............. | 180/227 |
| 5,961,135 A | * | 10/1999 | Smock | ........................ | 180/227 |
| 5,964,312 A | * | 10/1999 | Maldonado | .................. | 180/227 |
| 6,227,324 B1 | * | 5/2001 | Sauve | ......................... | 180/228 |
| 6,234,501 B1 | * | 5/2001 | Chen | ....................... | 280/87.041 |
| 6,273,205 B1 | * | 8/2001 | Tsai | ............................ | 180/181 |
| 6,332,621 B1 | * | 12/2001 | Wu | ........................ | 280/87.041 |
| 6,338,393 B1 | * | 1/2002 | Martin | ........................ | 180/227 |
| 6,431,567 B2 | * | 8/2002 | Tsai | ....................... | 280/87.041 |

* cited by examiner

*Primary Examiner*—Hau Phan
(74) *Attorney, Agent, or Firm*—Baker Botts L.L.P.

(57) ABSTRACT

A scooter includes front and rear frame parts coupled together through a pivot unit so as to permit turning of the rear frame part relative the front frame part. The front and rear frame parts are respectively formed with front and rear absorber-mounting members which are respectively disposed frontwardly and rearwardly of the pivot unit. Left and right shock-absorbers have front ends pivoted to the front absorber-mounting member, and rear ends pivoted to the rear absorber-mounting member. Each of the left and right shock-absorbers extends inclinedly and upwardly from the rear absorber-mounting member to the front absorber-mounting member so as to absorb shocks smoothly from vertical and horizontal directions.

6 Claims, 8 Drawing Sheets

SCOOTER WITH A SHOCK-ABSORBING UNIT

BACKGROUND OF THE INVENTION

1. Field of the Invention

The present invention relates to a scooter, more particularly to a scooter with a shock-absorbing unit.

2. Description of the Related Art

A conventional scooter generally includes a front frame body with a front wheel, and a rear frame body with a rear wheel. A shock-absorbing member is disposed between and interconnects the front and rear frame bodies for absorbing shocks acting on the conventional scooter.

However, the shock-absorbing effect provided by the conventional scooter upon encountering a shock is not smooth.

SUMMARY OF THE INVENTION

Therefore, the object of this invention is to provide a scooter having front and rear frame parts coupled pivotally through a pivot unit, and equipped with two shock-absorbers which cooperate with the pivot unit to provide smooth absorbing actions of the shock-absorbers.

According to the present invention, a scooter includes: a front frame part having a horizontally extending base with a rear coupling end, and a front absorber-mounting member that is disposed adjacent to the rear coupling end and that projects upwardly from the base; a front wheel connected rotatably to the front frame part; a pivot unit; a rear frame part having a front coupling end pivoted to the rear coupling end of the front frame part through the pivot unit so as to permit turning of the rear frame part relative to the front frame part, the rear frame part further having spaced apart left and right wheel-mounting arms extending rearwardly from the front coupling end in a transverse direction relative to the pivot unit, and a rear absorber-mounting member that is disposed adjacent to the front coupling end and that is fixed to and that extends upwardly from the wheel-mounting arms; a rear wheel connected rotatably to the wheel-mounting arms of the rear frame part; and left and right shock-absorbers having front ends pivoted to the front absorber-mounting member, and rear ends pivoted to the rear absorber-mounting member. Each of the left and right shock-absorbers extends inclinedly and upwardly from the rear absorber-mounting member to the front absorber-mounting member so as to absorb shocks from vertical and horizontal directions.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Referring to FIGS. 1 to 4, the preferred embodiment of a scooter according to the present invention is shown to include a front frame part 1, a front wheel 61, a rear frame part 2, a rear wheel 62, and a shock-absorbing unit 4.

As illustrated, the front frame part 1 has a horizontally extending base 100 with a rear coupling end 112 and a front coupling end 111 opposite to the rear coupling end 112, and an inverted U-shaped front absorber-mounting member 13 that is disposed adjacent to the rear coupling end 112 and that projects upwardly from the base 100. A front fork 122 extends downwardly from the front coupling end 111 of the front frame part 1.

Figure 1:
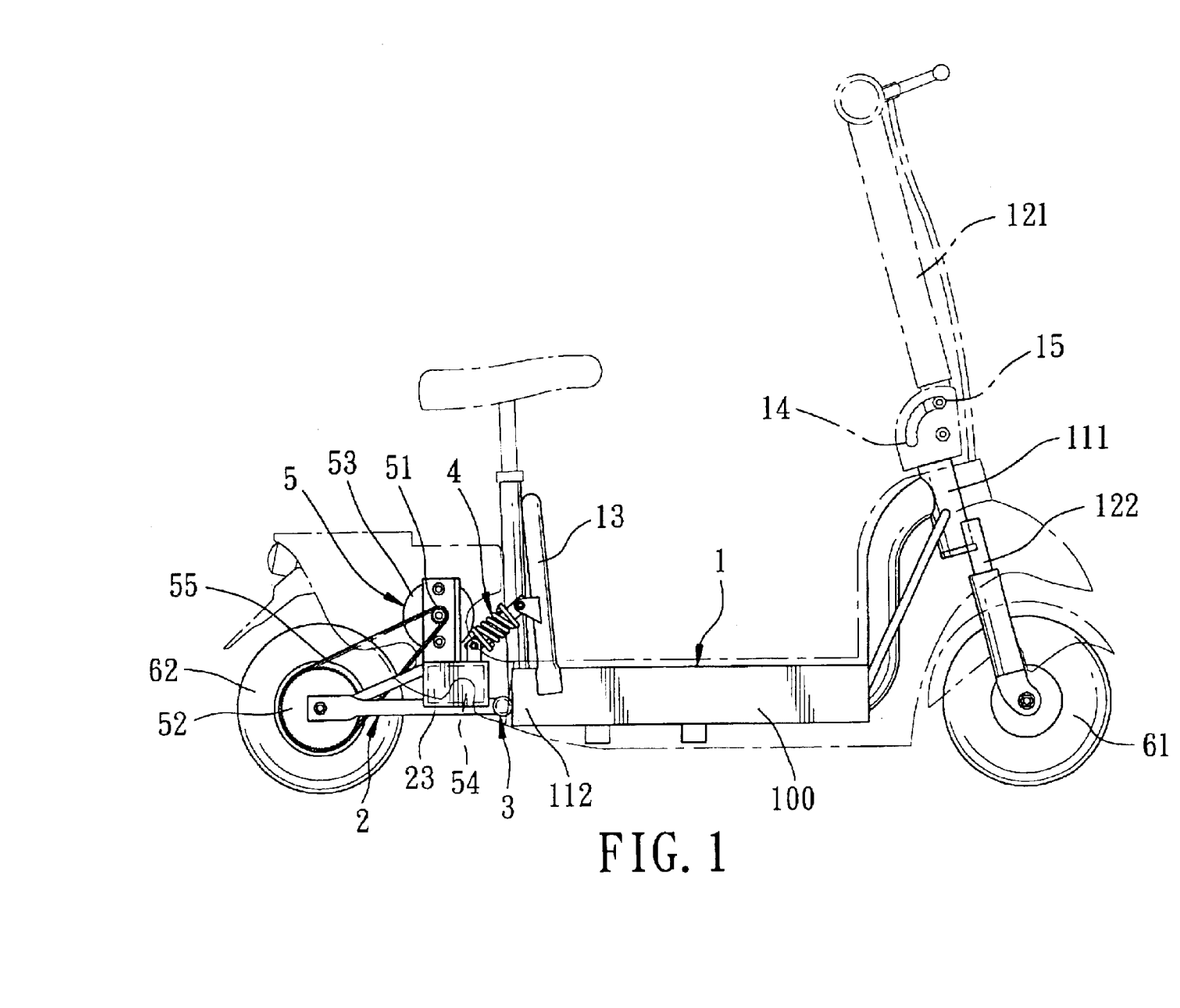
FIG. 1 is a schematic side view of the preferred embodiment of a scooter according to the present invention.

The front wheel 61 is connected rotatably to the front fork 122.

The rear frame part 2 has a front coupling end pivoted to the rear coupling end 112 of the front frame part I through a pivot unit 3 so as to permit turning of the rear frame part 2 relative to the front frame part 1. The rear frame part 2 further has spaced apart left and right wheel-mounting arms 21, 22 extending rearwardly from the front coupling end in a transverse direction relative to the pivot unit 3, and an inverted U-shaped rear absorber-mounting member 23 that is disposed adjacent to the front coupling end of the rear frame part 2 and that is fixed to and that extends upwardly from the wheel-mounting arms 21, 22.

Figure 2:
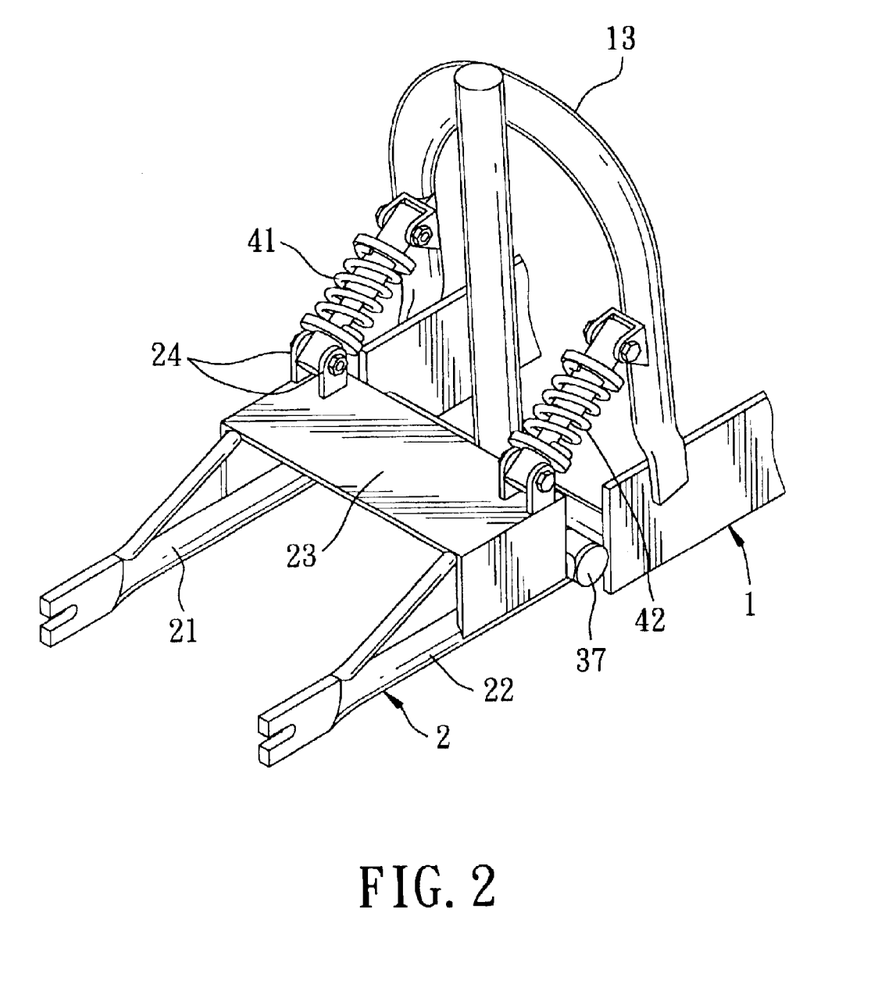
FIG. 2 is a fragmentary perspective view illustrating how left and right shock-absorbers interconnect front and rear frame parts of the preferred embodiment.

The rear wheel 62 is connected rotatably to the wheel-mounting arms 21, 22 of the rear frame part 2.

Figure 3:
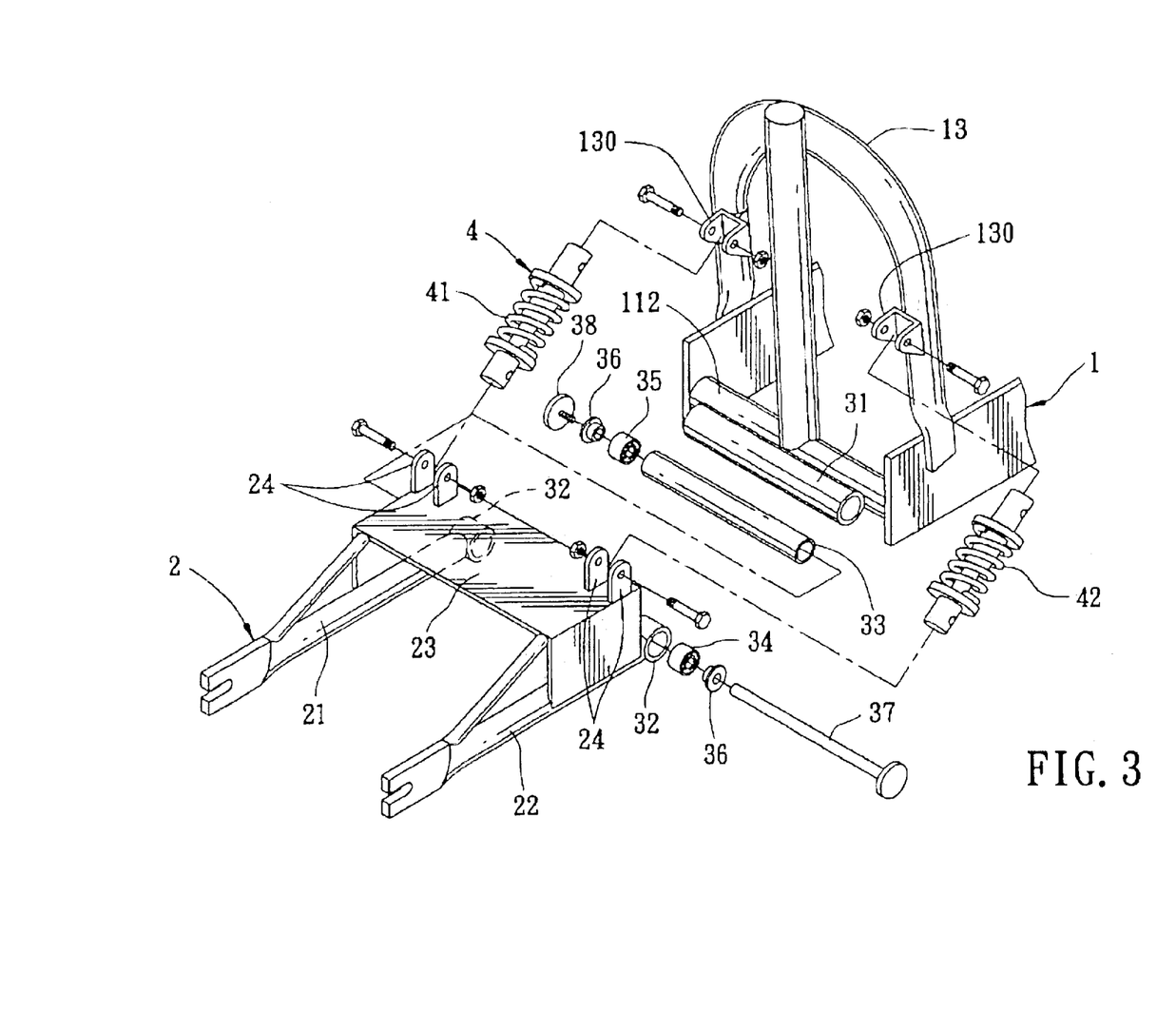
FIG. 3 is a fragmentary exploded perspective view of the preferred embodiment.
Figure 5:
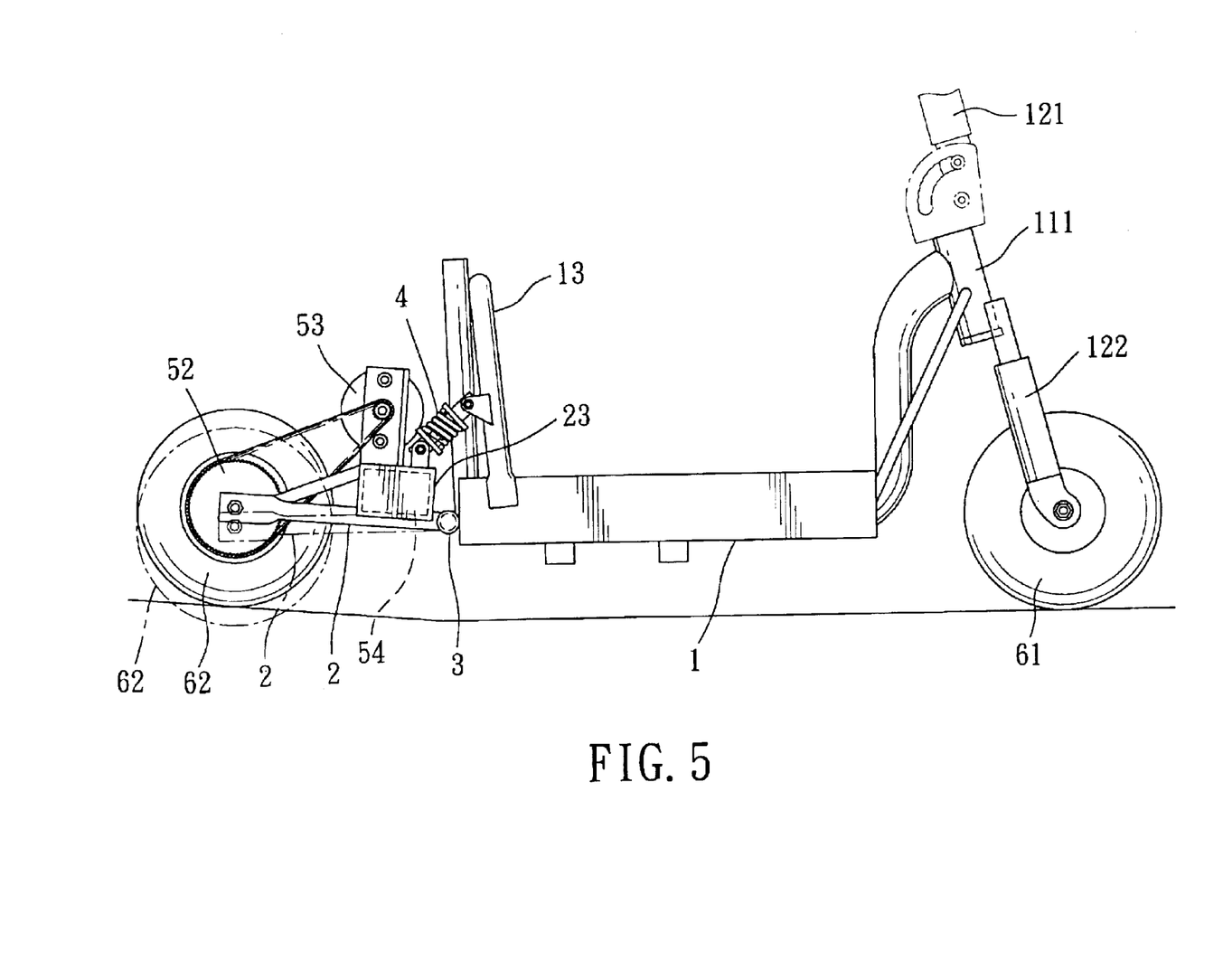
FIG. 5 is a schematic side view of the preferred embodiment, showing how the rear frame part reacts relative to the front frame part upon encountering a shock.

The shock-absorbing unit 4 includes left and right shock-absorbers 41, 42 which have front ends pivoted to the front absorber-mounting member 13, and rear ends pivoted to the rear absorber-mounting member 23. Preferably, each of the front and rear absorber-mounting members 13, 23 has left and right brackets 130, 24. The front and rear ends of the left and right shock-absorbers 41, 42 are pivoted to the left and right brackets 130, 24 of the front and rear absorber-mounting members 13, 23, respectively. Each of the left and right shock-absorbers 41, 42 extends inclinedly and upwardly from the rear absorber-mounting member 23 to the front absorber-mounting member 13 so as to absorb shocks from vertical and horizontal directions, as best shown in FIG. 5.

Figure 4:
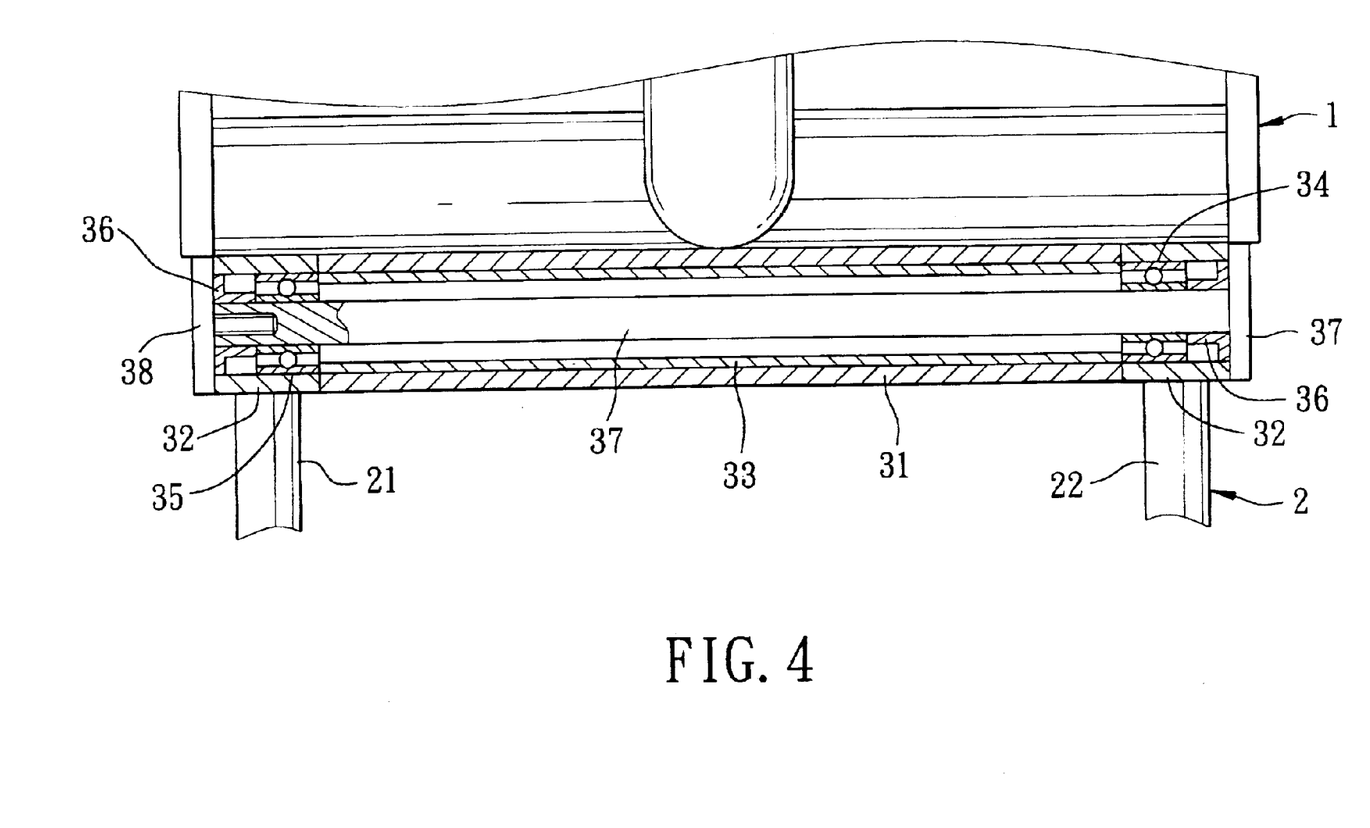
FIG. 4 is a fragmentary sectional view of a pivot unit of the preferred embodiment, illustrating how the front and rear frame parts are connected pivotally by the pivot unit.

In this embodiment, the pivot unit 3 is disposed between the front and rear frame parts 1, 2, and includes left and right knuckles 32, an outer sleeve 31, an inner sleeve 33, left and right bearing members 34, 35, left and right bearing retaining seats 36, and a shaft 37. The left and right knuckles 32 are fixed to the rear frame part 2, and cooperatively define the front coupling end of the rear frame part 2. The outer sleeve 31 is fixed to the rear coupling end 112 of the front frame part 1, and extends between the left and right knuckles 32. The inner sleeve 33 is disposed rotatably within the outer sleeve 31. The left and right bearing members 34, 35 are disposed respectively in the left and right knuckles 32. The left and right bearing retaining seats 36 are disposed respectively in the left and right knuckles 32. The shaft 37 is inserted through the left and right bearing retaining seats 36, the left and right bearing members 34, 35 and the inner sleeve 33, and engages a nut 38 in such a manner as to press the left and right bearing members 34,35 to abut against opposite ends of the inner sleeve 33. Under this condition, when the scooter of the present invention encounters a shock, the rear frame part 2 can rotate about the outer sleeve 31 so as to result in smooth absorbing action of the left and right shock-absorbers 41,42 (see FIG. 5).

A drive unit 5 is provided for driving the scooter of the present invention, and includes a motor 53 mounted on the rear absorber-mounting member 23 and having an output shaft, a front sprocket 51 fixed to the output shaft of the motor 53, a rear sprocket 52 fixed to an axle 623 of the rear wheel 62 (see FIG. 9), a chain 55 trained on the front and rear sprockets 51, 52, and a control device 54 for controlling activation and deactivation of the motor 53.

Figure 6:
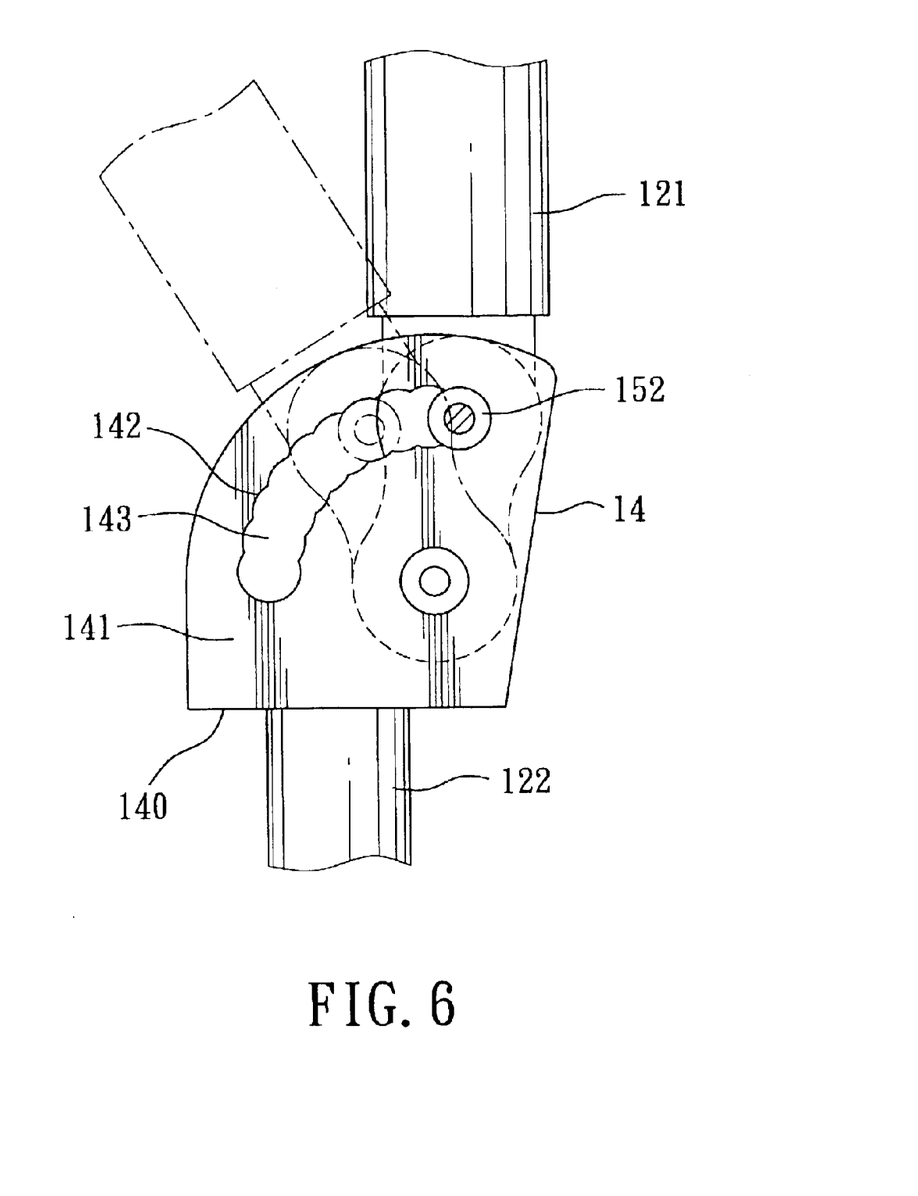
FIG. 6 is a fragmentary schematic view illustrating how a handle of the preferred embodiment is adjusted relative to a handle-mounting seat.
Figure 7:
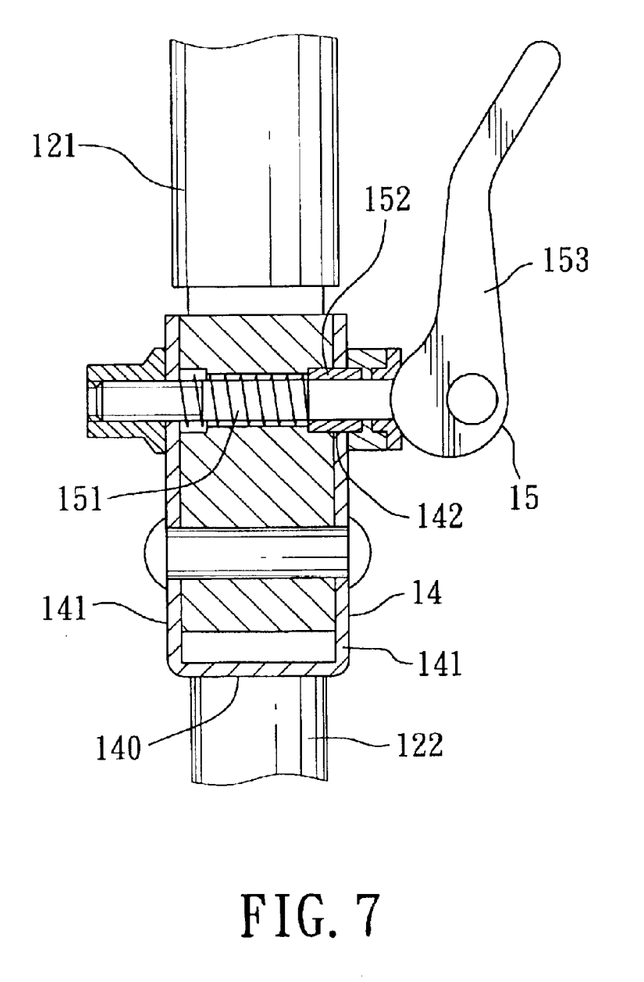
FIG. 7 is a fragmentary sectional view illustrating how the handle of the preferred embodiment is locked by a quick-release locking device to prevent position change of the handle relative to the handle-mounting seat.

Referring to FIGS. 1, 6 and 7, the preferred embodiment of the present invention further includes a generally U-shaped handle-mounting seat 14, a handle 121 and a quick-release locking device 15. The handle-mounting seat 14 is fixed to the front coupling end 111 of the front frame part 1, and includes a base 140 with two opposite ends, and a pair of spaced apart lugs 141 extending upwardly from the opposite ends of the base 140. The handle 121 is pivoted to the lugs 141, and extends upwardly therefrom. The quick-release locking device 15 includes a pair of aligned curved slots 143 respectively formed in the lugs 141 and confined by slot-defining walls, a plurality of continuous engaging grooves 142 formed in the slot-defining wall of one of the lugs 141, a spring-biased shaft 151 inserted movably through the slots 143 in the lugs 141 and the handle 121, an engaging tongue 152 fixed to the spring-biased shaft 151, and an operable lever 153 connected to the spring-biased shaft 151 so as to move the spring-biased shaft 151 between a locking position, in which the engaging tongue 152 extends into and engages one of the engaging grooves 142 (see FIG. 7) so as to prevent rotation of the handle 121 relative to the handle-mounting seat 14, and an unlocking position, in which, the engaging tongue 152 retracts from said one of the engaging grooves 142 so as to permit rotation of the spring-biased shaft 151 together with the handle 121 along the curved slots 143 and so as to permit the engaging tongue 152 to move to a selected one of the engaging grooves 142, thereby permitting position adjustment of the handle 121 relative to the handle-mounting seat 14.

Figure 8:
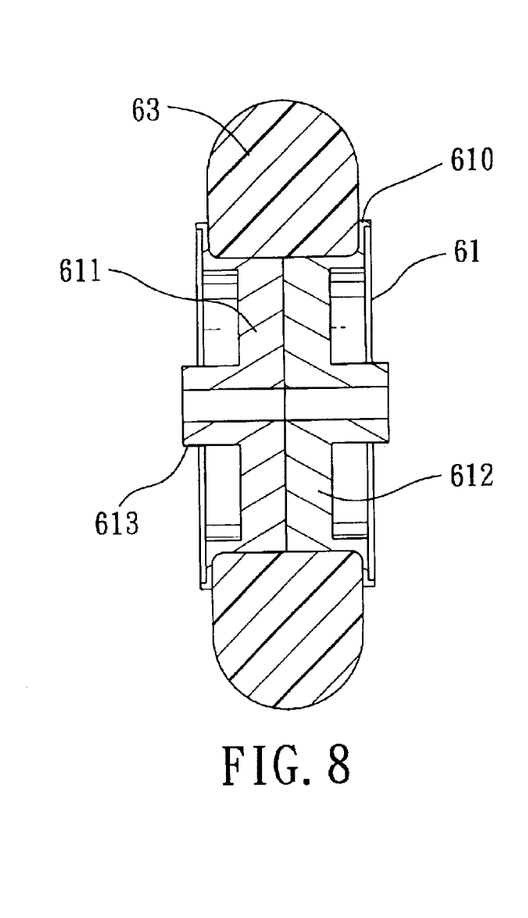
FIG. 8 is a sectional view of a front wheel employed in the preferred embodiment.
Figure 9:
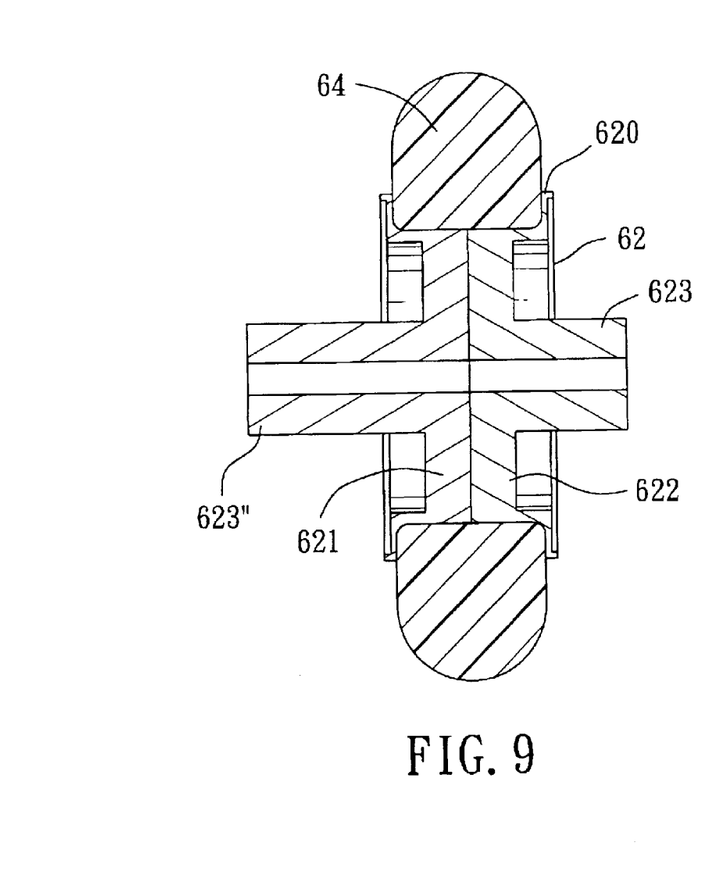
FIG. 9 is a sectional view of a rear wheel employed in the preferred embodiment.

Referring to FIGS. 8 and 9, each of the front and rear wheels 61, 62 of the scooter of the present invention includes an axle 613(623), and a wheel hub extending radially and outwardly from the axle 613(623) and having two symmetric halves 611,612(621,622) coupled together to define an annular tire-receiving groove 610(620). A solid tire 63(64) has a mounting portion mounted securely in the tire-receiving groove 610(620) in the wheel hub of each of the front and rear wheels 61, 62. In this embodiment, the axle 613(623) of each of the front and rear wheels 61, 62 includes two halves that are integrally and respectively formed with the symmetric halves 611,612(621,622) of the wheel hub. Preferably, the axle 623 of the rear wheel 62 is formed with an axial extension 623" to permit mounting of the rear sprocket 52 thereon (see FIG. 1). The front and rear wheels 61, 62 are preferably molded structures so that the same can be formed using a single mold (not shown) with corresponding inserts. The front and rear wheels 61, 62 are configured to facilitate repair of the wheels 61, 62.

With the inclusion of the pivot unit 3 and the left and right shock-absorbers 41, 42 to interconnect the front and rear frame parts 1, 2 of the scooter of the present invention, the aforesaid drawback of the conventional scooter can be eliminated.

With this invention thus explained, it is apparent that numerous modifications and variations can be made without departing from the scope and spirit of this invention. It is therefore intended that the invention be limited only as indicated in the appended claims.

I claim:

1. A scooter comprising:
   a front frame part having a horizontally extending base with a rear coupling end, and a front absorber-mounting member that is disposed adjacent to said rear coupling end and that projects upwardly from said base;
   front wheel rotatably connected to said front frame part;
   a pivot unit;
   a rear frame part having a front coupling end pivoted to said rear coupling end of said front frame part through said pivot unit so as to permit turning of said rear frame part relative to said front frame part, said rear frame part further having spaced apart left and right wheel-mounting arms extending rearwardly from said front coupling end in a transverse direction relative to said pivot unit, and a rear absorber-mounting member which is disposed adjacent to said front coupling end, which is fixed to said wheel-mounting arms, and which extends upwardly from said wheel-mounting arms;
   a rear wheel connected rotatably to said wheel-mounting arms of said rear frame part; and
   left and right shock-absorbers having front ends pivoted to said front absorber-mounting member, and rear ends pivoted to said rear absorber-mounting member, each of said left and right shock-absorbers extending inclinedly and upwardly from said rear absorber-mounting member to said front absorber-mounting member so as to absorb shocks from vertical and horizontal directions.

2. The scooter as defined in claim 1, wherein said pivot unit is disposed between said front and rear frame parts, and includes left and right knuckles defining said front coupling end of said rear frame part, an outer sleeve fixed to said rear coupling end of said front frame part and extending between said left and right knuckles, an inner sleeve disposed rotatably within said outer sleeve, left and right bearing members disposed respectively in said left and right knuckles, and left and right bearing retaining seats disposed respectively in said left and right knuckles and pressing said left and right bearings to abut against opposite ends of said inner sleeve, and a shaft inserted through said left and right bearing retaining seats, said left and right bearing members, and said inner sleeve so as to permit rotation of said rear frame part relative to said outer sleeve and so as to result in smooth absorbing actions of said left and right shock-absorbers when said scooter encounters a shock.

3. The scooter as defined in claim 2, wherein each of said front and rear absorber-mounting members has left and right brackets, said front and rear ends of said left and right shock-absorbers being pivoted to said left and right brackets of said front and rear absorber-mounting members, respectively.

4. The scooter as defined in claim 3, wherein said front frame part has a front coupling end opposite to said rear coupling end of said front frame part and formed with a generally U-shaped handle-mounting seat that has a base with two opposite ends, and a pair of spaced apart lugs extending upwardly from said opposite ends of said base, said scooter further comprising a front fork extending downwardly from said base to carry said front wheel, a handle pivoted to said lugs and extending upwardly therefrom, and a quick-release locking device including a pair of aligned curved slots respectively formed in said lugs and confined by slot-defining walls, a plurality of engaging grooves formed in said slot-defining wall of at least one of said lugs, a spring-biased shaft inserted movably through said slots in said lugs and said handle, an engaging tongue fixed to said spring-biased shaft, and an operable lever connected to said spring-biased shaft so as to move said spring-biased shaft between a locking position, in which said engaging tongue extends into and engages one of said engaging grooves so as to prevent rotation of said handle relative to said handle-mounting seat, and an unlocking position, in which said engaging tongue retracts from said one of said engaging grooves so as to permit rotation of said spring-biased shaft together with said handle along said curved slots and so as to permit said engaging tongue to move to a selected one of said engaging grooves, thereby permitting position adjustment of said handle relative to said handle-mounting seat.

5. The scooter as defined in claim 4, wherein each of said front and rear wheels includes an axle, a wheel hub extending radially and outwardly from the axle and having two symmetric halves coupled together to define an annular tire-receiving groove, and a solid tire having a mounting portion that is mounted securely in said tire-receiving groove.

6. The scooter as defined in claim 5, wherein said axle of each of said front and rear wheels includes two halves that are integrally and respectively formed with said symmetric halves.

* * * * *